United States Patent
Knittel et al.

(10) Patent No.: US 7,940,620 B2
(45) Date of Patent: May 10, 2011

(54) MODIFIED JITTER CRITERION FOR OPTICAL RECORDING MEDIA

(75) Inventors: Joachim Knittel, Tuttlingen (DE); Christof Ballweg, Laufen (CH); Rudolf Eyberg, Villingen (DE)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 12/452,541

(22) PCT Filed: Jun. 26, 2008

(86) PCT No.: PCT/EP2008/058131
§ 371 (c)(1),
(2), (4) Date: Jan. 7, 2010

(87) PCT Pub. No.: WO2009/007243
PCT Pub. Date: Jan. 15, 2009

(65) Prior Publication Data
US 2010/0128584 A1 May 27, 2010

(30) Foreign Application Priority Data

Jul. 9, 2007 (EP) .................................... 07112031
Nov. 21, 2007 (EP) .................................... 07121176

(51) Int. Cl.
*G11B 7/00* (2006.01)

(52) U.S. Cl. .................................. 369/53.34; 369/47.53
(58) Field of Classification Search .................. None
See application file for complete search history.

(56) References Cited

U.S. PATENT DOCUMENTS

| | | | |
|---|---|---|---|
| 7,154,833 B2 * | 12/2006 | Ogawa | 369/53.34 |
| 2004/0008594 A1 | 1/2004 | Tokita et al. | |
| 2004/0017750 A1 * | 1/2004 | Hsu et al. | 369/47.53 |
| 2004/0160874 A1 * | 8/2004 | Hwang et al. | 369/47.53 |
| 2005/0270941 A1 | 12/2005 | Nakajo | |

FOREIGN PATENT DOCUMENTS

| | | |
|---|---|---|
| EP | 0982719 | 3/2000 |
| EP | 1189218 | 3/2002 |

OTHER PUBLICATIONS

Search Report Dated Sep. 4, 2008.

* cited by examiner

*Primary Examiner* — Joseph Haley
(74) *Attorney, Agent, or Firm* — Robert D. Shedd; Jeffrey M. Navon

(57) ABSTRACT

The present invention relates to a method for checking the quality of a recording on a disk intended to be read with a first wavelength and intended to be recorded with a second wavelength, directly with the second wavelength used by the recording system. According to the invention, the method uses a modified jitter definition when a jitter value of recorded information is measured using light of the first wavelength. A special equalizer takes account of a required asymmetry.

9 Claims, 3 Drawing Sheets

MODIFIED JITTER CRITERION FOR OPTICAL RECORDING MEDIA

Figure 1:
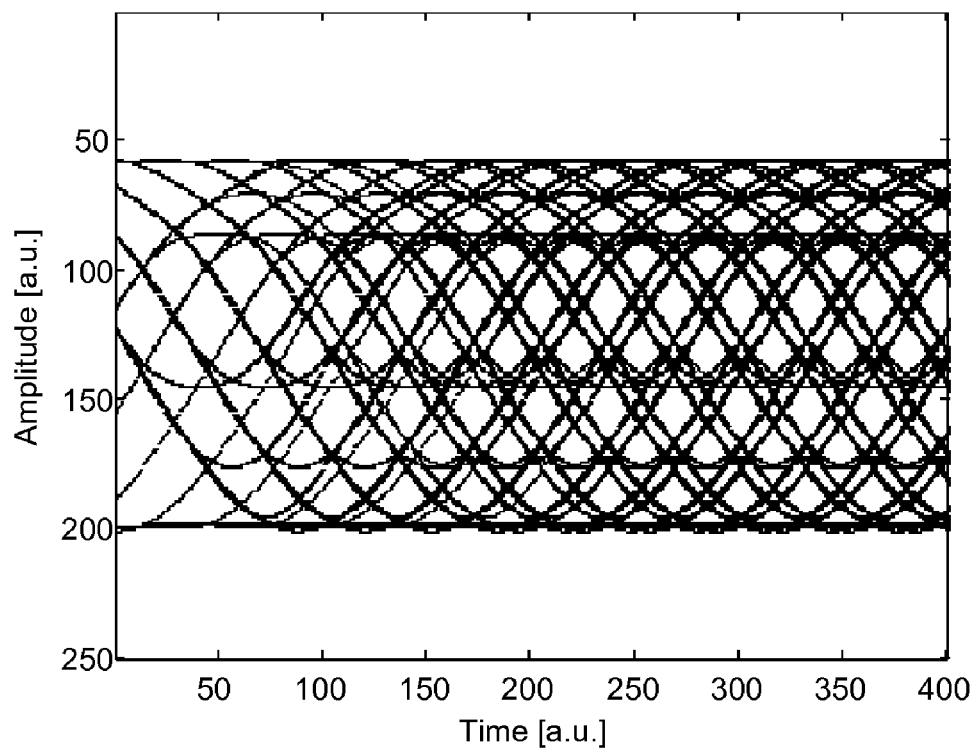

This application claims the benefit, under 35 U.S.C. §365 of International Application PCT/EP2008/058131, filed Jun. 26, 2008, which was published in accordance with PCT Article 21(2) on Jan. 15, 2009 in English and which claims the benefit of European patent application No. 07112031.5, filed Jul. 9, 2007 and European patent application No. 07121176.7, filed Nov. 21, 2007.

The present invention relates to a method for analyzing the recording quality of an optical recording medium intended to be recorded using light of a first wavelength and intended to be read using light of a second wavelength, directly with the light of the first wavelength used by the recording system.

Recently a recording system using a laser with a blue wavelength for producing ROM like DVD media, which are intended to be read with a DVD player using a red wavelength, has been proposed. This system is called Burn to DVD. In order to analyze the recording quality directly with the blue recording system, it is necessary to have a reliable quality criterion.

It is an object of the invention to propose a method for analyzing the recording quality of an optical recording medium intended to be recorded using light of a first wavelength and intended to be read using light of a second wavelength, directly with the light of the first wavelength used by a recording system.

According to the invention, this object is achieved by a method for analyzing the recording quality of an optical recording medium, having the steps of:
measuring a jitter value of recorded information using light of a first wavelength;
generating a modified jitter value for light of a second wavelength from the measured jitter value; and
analyzing the modified jitter value for determining the recording quality.

Similarly, a system for analyzing the recording quality of an optical recording medium has:
a jitter detector for measuring a jitter value of recorded information using light of a first wavelength;
a correction block for generating a modified jitter value for light of a second wavelength from the measured jitter value; and
an analyzer for analyzing the modified jitter value for determining the recording quality.

Recording experiments with the above described recording system have shown that the best recording quality, e.g. a low jitter, is achieved with the blue light used by the recording system, if the recorded HF eye-pattern shows a certain amount of asymmetry upon reading using the blue wavelength. An optical recording medium that shows a perfect HF eye pattern with a reading system using light with a red wavelength range shows an asymmetric HF eye pattern upon reading with light having a blue wavelength. In other words, a low jitter measured with light having a blue wavelength does not imply a low jitter when measured with light having a red wavelength. Therefore, the invention proposes to generate a special modified jitter value, which has the property that a low modified jitter determined using a blue wavelength does imply a low jitter for the red wavelength. Of course, the invention is not limited to a blue wavelength for recording and a red wavelength for reading. It is likewise applicable to other combinations of wavelengths.

The modified jitter is advantageously used to perform test recordings to adapt the recording system, e.g. the recording power, before the actual recording process is started. Even if a combo drive including a recording system using the first wavelength and a reading system using the second wavelength is available, it is rather difficult to perform test recordings using the first wavelength, which are then analyzed using the second wavelength. This is due to the fact that in practice the two focal spots will generally not focus on exactly the same track. As a consequence, it is difficult to find the location of the test pattern recorded using the first wavelength with a light beam of the second wavelength.

Advantageously, the modified jitter value is obtained by manipulating the measured jitter value with one or more correction coefficients. This avoids complex calculations and allows to easily determine the modified jitter value.

Favorably, the one or more correction coefficients are obtained from the optical recording medium or from a memory included in the system. In the first case a special area is preferably provided on the optical recording medium for storing the one or more correction coefficients.

The method according to the invention is thus useful both for a quick check of the recorded media, and to optimize the recording strategy for good jitter, symmetry and resolution during development of optical recording media.

Consequently, a method for adapting a write strategy of a recording system has the steps of:
performing one or more test recordings on an optical recording medium;
measuring a jitter value of a test recording using light of a first wavelength;
generating a modified jitter value for light of a second wavelength from the measured jitter value; and
modifying parameters of the write strategy to obtain an optimized modified jitter value.

The above method is advantageously performed in an apparatus for writing to optical recording media. For this purpose the apparatus has:
a jitter detector for measuring a jitter value of recorded information using light of a first wavelength;
a correction block for generating a modified jitter value for light of a second wavelength from the measured jitter value;
an analyzer for analyzing the modified jitter value for determining the recording quality; and
means for modifying parameters of a write strategy in response to the modified jitter value.

By adapting the write strategy an optimized recording quality is achieved. The adapted write strategy is, for example, determined experimentally by the manufacturer of the optical recording medium, or in the frame of a calibration procedure in the writing apparatus. In the latter case, the adaptation is preferably performed on a time-by-time basis, or before a writing process is initiated.

The method according to the invention gives a good prediction during recording tests at the first wavelength about the reading characteristics at the second wavelength. Therefore, no time consuming measurements with a light source of the second wavelength are needed. Standard recording optimization procedures can be used, e.g. writing of short test patterns. No additional hardware is needed.

Advantageously, the modified jitter value is obtained using a special equalizer that takes the required asymmetry into account.

Figure 2:
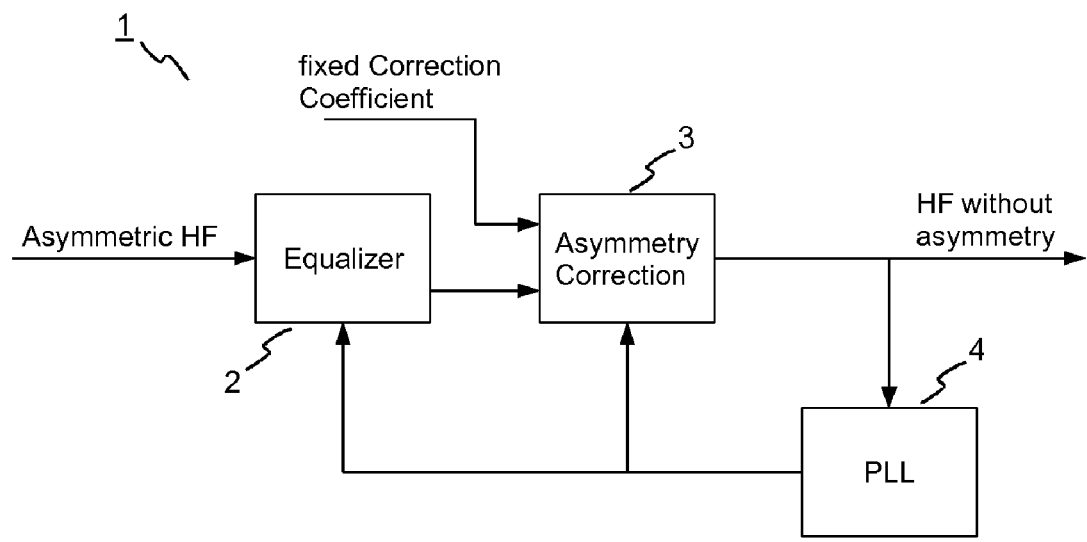
Figure 3:
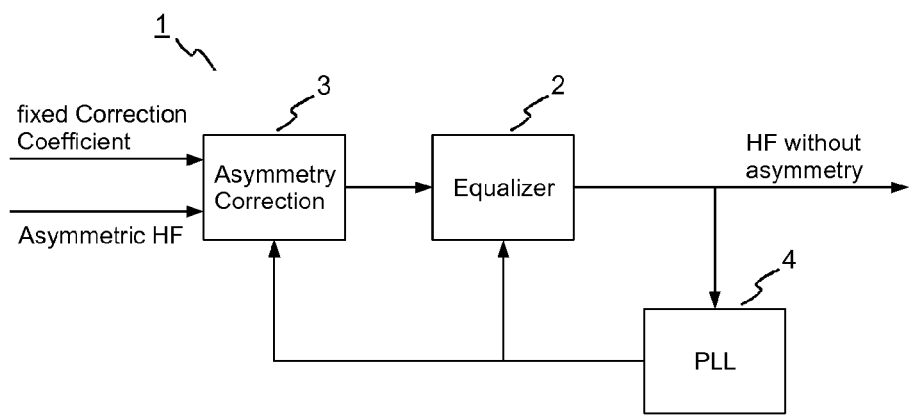
Figure 4:
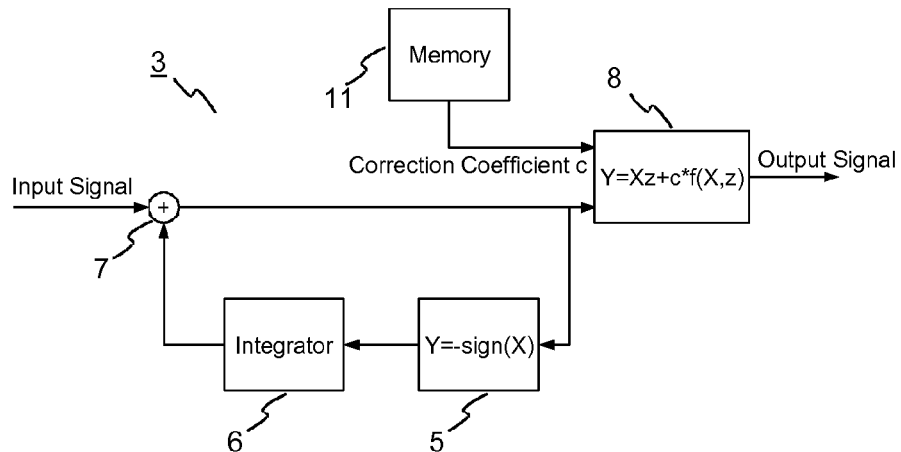
Figure 5:
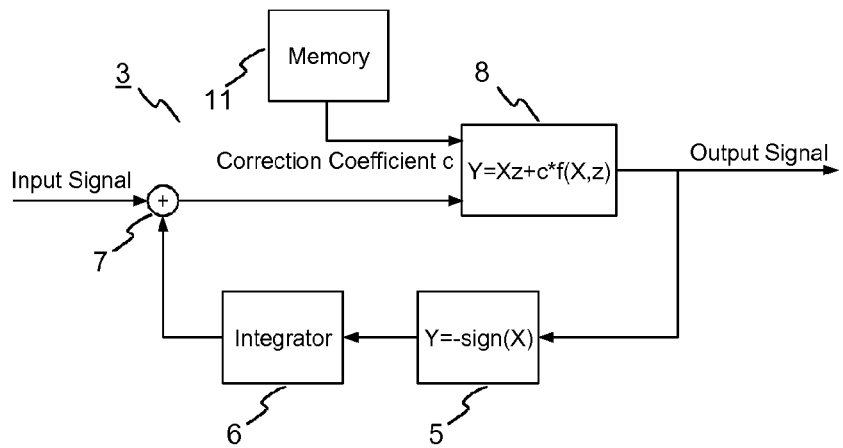
Figure 6:
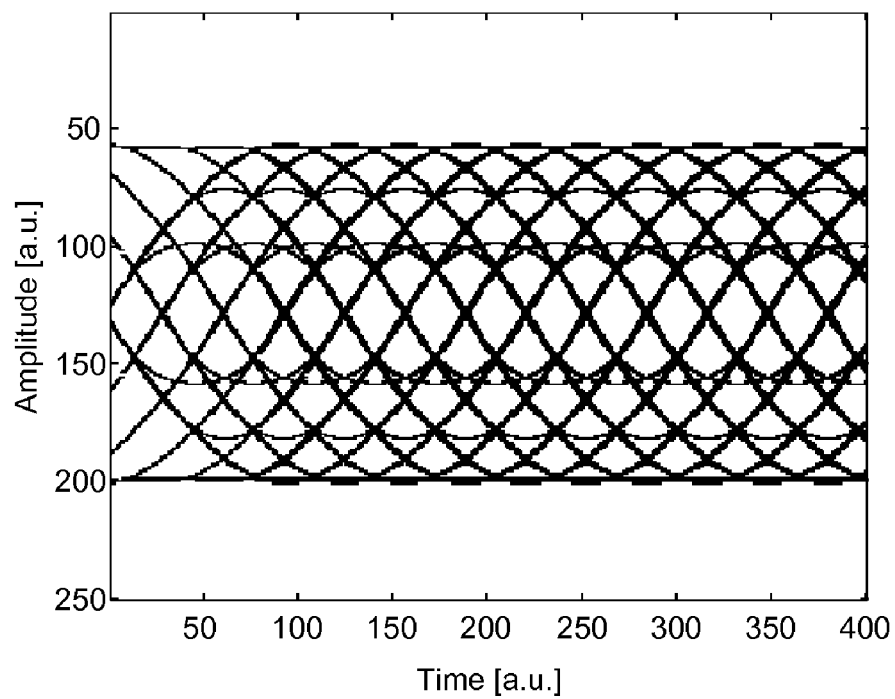
Figure 7:
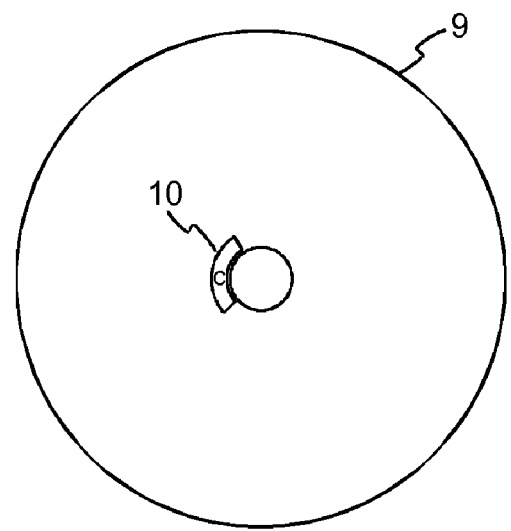

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 shows a typical asymmetric eye-pattern determined using a blue wavelength, FIG. 2 shows a schematic circuit diagram for implementing the method according to the invention, FIG. 3 shows an alternative implementation of the circuit of FIG. 2, FIG. 4 illustrates an implementation of an asymmetry correction block, FIG. 5 illustrates an alternative implementation of the asymmetry correction block, FIG. 6 shows the eye-pattern of FIG. 1 with nearly zero asymmetry after application of the modified jitter, and FIG. 7 depicts an optical recording medium, on which information for generating a modified jitter value is stored.

FIG. 1 shows a typical asymmetric eye-pattern determined using a blue wavelength. As can be seen, the short symbols with a small amplitude have a DC-shift in comparison to the DC-level of the entire signal. Such an asymmetric eye-pattern is found to be necessary to achieve good reading results with a red wavelength. The eye-pattern has a very high jitter. Therefore, the measured jitter is not a suitable criterion for the recording quality.

A useful criterion is a modified jitter value, which can be obtained with the circuit 1 that is shown schematically in FIG. 2. An incoming asymmetric HF signal is equalized by an equalizer 2. An asymmetry correction block 3 performs an asymmetry correction of the HF signal after equalization. Alternatively, asymmetry correction of the HF signal is performed before equalization, as illustrated in the alternative implementation in FIG. 3. A PLL 4 (phase locked loop) is used for proper timing of the circuit 1. For asymmetry correction a fixed correction coefficient is used. This fixed correction coefficient depends on the optical recording medium. It is, for example, determined experimentally by the manufacturer of the optical recording medium, or by a user. In the latter case, the correction coefficient is preferably determined on a time-by-time basis, or before a writing process is initiated. One way to determine the value is to take an optical recording medium with a very good jitter value for the red wavelength and to measure the modified jitter with the blue wavelength. The fixed correction coefficient is then varied until the modified jitter takes its minimum value. The fixed correction coefficient is preferably stored in a special area on the optical recording medium. Alternatively or in addition, correction coefficients for different types of optical recording media are stored in a memory of an apparatus for reading from and/or writing to optical recording media.

A first and a second implementation of the asymmetry correction block 3 are shown in FIG. 4 and FIG. 5, respectively.

The asymmetry compensation block 3 consists of three sub blocks. A comparator block 5 (Y=−sign(X)) and a subsequent integrator block 6 are used to make the input signal X symmetric to zero. For this purpose the output signal of the integrator block 6 is added to the input signal X by an adder 7. The third block 8 (Y=Xz+c*f(X,z)) uses a correction coefficient c to compensate for the asymmetric signal parts. The correction coefficient c is obtained from the optical recording medium or from a memory 11, which is not necessarily included in the asymmetry compensation block 3. In the formulas shown in FIGS. 4 and 5 Y designates the output samples of the signal, whereas X designates the input samples of the signal.

To give an example, in order to compensate for the asymmetry and to adapt the symbol amplitudes the formula $$Y = \sum_{i=1}^{n} a_i X z^{-i} + c * \left(X z^{-\frac{n}{2}}\right)^2$$

can be used by the block 8, where the coefficients $a_i$ and c are fitted to the measured data. The coefficients $a_i$ can likewise be stored in addition to the correction coefficient c. In this formula $z^{-n}$ designates the delay elements for n cycles in a digital system. The number n is determined by the ratio between the signal frequency and the sampling frequency. For example, for a DVD with a signal frequency of 26.16 MHz n would be approximately 20 for a sampling rate of 100 MS/s.

In FIG. 6 the eye-pattern of FIG. 1 after application of the proposed correction is shown. As can be seen, the asymmetry is reduced to nearly zero. The jitter measured with the blue wavelength in combination with the application of a correction thus allows to determine the jitter that will be measured with the red wavelength.

In FIG. 7 an optical recording medium 9 with a recorded correction coefficient is illustrated. The optical recording medium has a special area 10 in which the correction coefficient is stored. The correction coefficient depends only from the optical recording medium. This means that for each type of optical recording medium 9 with its specific recording layer system a slightly different correction coefficient is needed. This correction coefficient is advantageously determined in advance by the manufacturer of the optical recording medium and stored in the special area 10. The correction coefficient is useful during optimization of the recording strategy for the optical recording medium 9.

In the above, a single correction coefficient is used. However, with one or more additional coefficients not only the asymmetry, but also the different resolutions of shorter symbol lengths (3T, 4T, . . . ) can be modified. This is useful to optimize and achieve the critical resolution of the short symbols (especially 3T) at the red wavelength. This is achieved by selecting a suitable function *f* as shown in FIGS. 4 and 5.

The invention claimed is:

1. A method for analyzing the recording quality of an optical recording medium, having the steps of:
    measuring a jitter value of recorded information using light of a first wavelength;
    generating a modified jitter value for light of a second wavelength from the measured jitter value; and
    analyzing the modified jitter value for determining the recording quality by checking whether a low modified jitter value is determined.

2. The method according to claim 1, wherein the step of generating a modified jitter value includes manipulating the measured jitter value with one or more correction coefficients.

3. The method according to claim 2, further having the step of reading the one or more correction coefficients from the optical recording medium or from a memory.

4. A system for analyzing the recording quality of an optical recording medium, with:
    a jitter detector for measuring a jitter value of recorded information using light of a first wavelength;
    a correction block for generating a modified jitter value for light of a second wavelength from the measured jitter value; and an analyzer for analyzing the modified jitter value for determining the recording quality by checking whether a low modified jitter value is determined.

5. A method for adapting a write strategy of a recording system, having the steps of:
- performing one or more test recordings on an optical recording medium;
- measuring a jitter value of a test recording using light of a first wavelength;
- generating a modified jitter value for light of a second wavelength from the measured jitter value; and
- modifying parameters of the write strategy to obtain an optimized modified jitter value, such that a low optimized modified jitter value measured at the first wavelength implies a low jitter value measured at the second wavelength.

6. A apparatus for writing to optical recording media, with:
- a jitter detector for measuring a jitter value of recorded information using light of a first wavelength;
- a correction block for generating a modified jitter value for light of a second wavelength from the measured jitter value;
- an analyzer for analyzing the modified jitter value for determining the recording quality, and
- means for modifying parameters of a write strategy in response to the modified jitter value.

7. The apparatus according to claim 6, further having a memory for storing a correction coefficient for the correction block.

8. A method for writing to an optical recording medium with light of a first wavelength, wherein a write strategy used for recording is adjusted such that an asymmetric eye pattern is reached when reading with said light of the first wavelength, whereas a symmetric eye pattern is reached when reading with light of a second wavelength.

9. An optical recording medium, wherein it includes one or more correction coefficients for generating a modified jitter value for light of a second wavelength from a jitter value measured using light of a first wavelength, wherein a low modified jitter value measured at the first wavelength implies a low jitter value measured at the second wavelength.

* * * * *